United States Patent Office 3,694,299
Patented Sept. 26, 1972

3,694,299
MULTIPLE GLAZED UNIT AND METHOD
OF MANUFACTURE
William E. Wagner, Verona, Pa., assignor to PPG
Industries, Inc., Pittsburgh, Pa.
No Drawing. Continuation of application Ser. No.
785,790, Dec. 20, 1968. This application May 27,
1971, Ser. No. 147,640
Int. Cl. C03b 23/24, 39/00
U.S. Cl. 161—45                     13 Claims

ABSTRACT OF THE DISCLOSURE

A multiple glazed unit comprising a pair of spaced glass sheets is formed by depositing a metal oxide on the interfacial surface of at least one of the glass sheets, and then fusing the edge portions of the sheets together. The metal oxide film has a water-wetting surface contact angle of from about 40° to about 90°. The metal oxide film can also be produced by depositing an organo-metallic film forming material on the interfacial surface and then heating the organo-metallic material to a temperature sufficient to produce the metal oxide film.

---

This application is a continuation of Ser. No. 785,790, filed Dec. 20, 1968, now abandoned.

BACKGROUND OF THE INVENTION

This invention relates to an improved method for producing multiple glazed window units and, more particularly, to a novel method for protecting the interfacial surfaces of a pair of superimposed glass sheets during the manufacture of welded multiple glazed units.

In accordance with U.S. Pats. No. 2,624,979, No. 2,999,036 and No. 3,268,316, all assigned to the assignee of the present invention, one preferred method for fabricating all-glass multiple glazed units proceeds by placing a pair of glass sheets in alignment on a conveyor, with one sheet following the other. For reasons that will become apparent hereinafter, the leading sheet of this pair has slightly larger length and width dimensions than the trailing sheet. The two sheets are then moved along the conveyor through a washing, rinsing and drying operation.

After drying, the leading sheet is then positioned and centered in vertical relation to a vacuum head and a plurality of striping applicators. The vacuum head engages and elevates the leading sheet, and the striping applicators stripe the bottom marginal edge surface portion of the sheet about its periphery with an electrically conducting solution, such as colloidal graphite. During striping, the trailing sheet, hereinafter referred to as to the bottom sheet, is brought into vertical alignment below the leading sheet, hereinafter referred to as the top sheet. After the top sheet has been striped, the vacuum head lowers this sheet into superimposed face-to-face relation on the bottom sheet. The pair of superimposed sheets are then slightly elevated by rods or fingers raised from below the bottom sheet, and the sheets are deposited on a charging car in proper superimposed face-to-face alignment for subsequent fabrication into a welded multiple glazed unit.

After the sheets are superimposed and aligned in the above manner, they are heat treated for a period of from about 40 seconds to 3 minutes in a preheat furnace having an ambient temperature of approximately 1300°–1400° F. The larger glass units, for which the method of the present invention is particularly applicable, are usually heat treated in the preheat furnace for from 1 to 3 minutes. During preheating, the glass sheets are heated to a temperature of approximately 600° to 800° F. in order to avoid thermal shock to the glass sheets during the subsequent welding operation.

After the superimposed glass sheets are heat treated, they are conveyed into the welding furnace, where the ambient temperature is approximately 800° to 850° F. Upon attaining the desired position in the welding furnace, vacuum chucks cause the superimposed sheets to be separated in slightly spaced relationship to each other. The welding operation is then effected on the thus-separated glass sheets.

Welding is accomplished by passing an electric current through the stripe of electrically conductive material to effect heating of the stripe and the glass immediately adjacent thereto. The margins of the top or upper sheet that extend beyond the bottom or lower sheet are heated in this manner until they droop and become welded or fused to the margins of the bottom or lower sheet. The vacuum chuck is then operated to pull the top sheet upwardly to provide a chamber between the sheets. During this movement, the air pressure within the chamber is abruptly increased by permitting air from a pressurized external source to enter the unit through a pore opening provided in a face or an edge of the unit. This operation effects a filleting of the welded connection between the sheets. The pore opening then allows for equalization of the air pressure inside and outside the unit during subsequent annealing and cooling.

In a manufacturing process such as described above, there is a tendency for the glass sheets to fuse together during preheating, thus preventing their separation in preparation for the welding operation. This has constituted a serious problem and has resulted in producing a lower yield than is desirable. This fusion at the superimposed surfaces or interfaces is readily observable in the welding furnace where the vacuum chucks come into contact with the superimposed glass sheets and are then unable to separate them for welding. Thus, in the past, many glass sheets, particularly large sheets that are intended for fabrication of large double glazed units, have been observed to fuse together at their adjacent inner surfaces during the preheating operation.

Another problem that is encountered is the tendency to scratch one or both of the glass sheets at their interfaces during the step of placing the glass sheets in superimposed face-to-face relationship in preparation for preheating and welding. This scratching results from relative movement between the glass sheets, either while they are being placed in superimposed relationship or during the concurrent aligning operation. The scratches may be caused either by the presence of minute abrasive particles between the glass sheets, or merely by sliding one glass sheet surface across the other. Scratches produced in this or any other way will cause the rejection of the multiple glazed unit.

A further problem which is closely related to the above problems is that of the decreased speed of operation, and thus a decrease in the rate of production, that results whenever attempts are made by the operator to compensate for the problems of fusion and scratching. Thus, operator attempts to free fused glass sheets, as well as his taking excessive care to avoid or immediately reject scratched sheets, invariably slows down the overall speed of operation.

The present invention is directed towards ameliorating or substantially eliminating the foregoing problems. More specifically, the present invention provides means whereby a pair of glass sheets can be placed in superimposed relation, one on top of the other, and then preheated to the desired temperature for welding without fusing or scratching the interfacial surfaces of the glass sheets.

In the practice of the present invention, the above is accomplished by providing the interfacial surface of at least one of the glass sheets with a metal oxide film having a relatively high water-wetting surface contact angle. In accordance with the present invention, the interposed metal oxide film prevents scratching of the interfacial surfaces of the glass sheets when they are initially placed in superimposed relation or subsequently moved relative to each other. Moreover, when the interfacial surfaces of the superimposed pair of glass sheets are heated to elevated temperatures above about 350°–500° F., the interposed metal oxide film precludes sticking or fusion of the adjacent glass sheet surfaces. Also, in accordance with this invention, proper choice of film composition and control of film thickness can produce various desirable light- and heat-controlling properties, as well as desirable aesthetic effects in the completed multiple glazed unit.

The present invention will be better understood when reference is had to the following detailed example, which constitutes a preferred embodiment of the invention.

An organo-metallic film-forming solution was prepared having the following ingredients in grams by weight:

| Ingredients: | Grams by weight |
| --- | --- |
| 80% solution in xylene of 2,2,4 trimethyl 1,3 pentanediol titanate | 72 |
| Englehard Industries' Resin 6617 [1] | 36 |
| Xylene | 90 |
| Methyl ethyl ketone | 5600 |

[1] Resin 6617 is a terpene-type resin used to give good film flow-out properties when applying the organo-metallic film-forming solution.

This organo-metallic film-forming solution was sprayed on the interfacial surface of the bottom sheet of glass and allowed to dry thereon while the top sheet of glass was being striped with electrically conducting solution. Drying of the film-forming solution was accomplished in a matter of a few seconds. The top sheet was then placed on the bottom sheet, and the glass sheet pair was preheated in an ambient environment of about 1100° to 1200° F. for 3 to 4 minutes. No sticking or fusion of the interfacial surfaces of the superimposed glass sheets occurred. Moreover, no scratching of these interfacial surfaces was observed. On the other hand, other sheets not treated with the above film-forming solution were found to fuse together at their interfacial surfaces. The titanium dioxide film that formed on the sprayed glass sheet surface was found to be completely transparent, hard and durable. This film exhibited a water-wetting surface contact angle of about 75 to 80°.

Organo-metallic film-forming solutions that are within the contemplation of this invention principally include organo-metallic solutions of titanium, tin, nickel, chromium, cobalt, iron, magnesium and combinations or mixtures thereof. The only requirement is that the metal oxide film produced therefrom have a water-wetting surface contact angle sufficient to preclude fusion and scratching of the interfacial surfaces of a pair of superimposed glass sheets when heated to elevated temperatures. For example, the water-wetting surface contact angle for tin is about 40°–45°; for nickel it's about 65°–70°; and for chromium it's about 80°–85°. Moreover, particular metals or combination of metals may be chosen for the specific color, optical or light- and heat-controlling properties they impart. Thus, the present invention also encompasses providing desirable environmental control properties and aesthetic effects in the completed multiple glazed unit.

While it is not known, it is theorized that the intermolecular attraction between the metal oxide filmed surface and the untreated glass sheet surface at elevated surface temperatures, e.g., above about 350°–400° F., is less than the intermolecular attraction between two untreated glass sheet surfaces placed in face-to-face relation at such temperatures. In any event, it has been found that providing a metal oxide film having a water-wetting surface contact angle of from about 40° to about 90° eliminates surface fusion when preheating superimposed glass sheet pairs to temperatures of from about 350° to 1000° F.

In the present invention, the water contact angle used as the measure of preventing glass fusion at elevated temperatures is determined in the following manner. The glass sample to be tested is positioned as nearly as possible in a flat horizontal orientation and a single drop of water is placed on the glass using any convenient water-drop dispenser. The angle made between the horizontal surface of the glass and periphery of the water drop just adjacent to the point of contact between the drop and the glass surface is the contact angle measured. Angles between 0 and 20° are classified as angles of low fusion-preventing capability. This is the range of angles normally exhibited by untreated glass surfaces. Angles between 20 and 40° indicate that some degree of fusion-preventing capability has developed. Angle measurements between 40 and 60° indicate relatively good fusion-preventing capability and any angular measurement between 65 and 85° indicates high fusion-preventing capability. Improvements in fusion-preventing capability become increasingly apparent as the contact angle increases upwardly from about 40°.

From the above description of a specific embodiment of the present invention, it will be readily apparent to those skilled in the art that various modifications may be made without departing from the spirit of the invention. For example, various organo-metallic film-forming materials, carriers, diluents, adjuvant agents and the like within the range of equivalents other than those specifically mentioned may be employed in practicing the method of the present invention. Also, it should be obvious that either one or both of the interfacial surfaces of the glass sheets may be coated with a suitable metal oxide film. In addition, any satisfactory contacting or coating procedure other than the disclosed spray application can be used to deposit the metal oxide film on the surfaces of the glass sheets. Such procedures may include use of roller applicators, dipping tanks, vacuum deposition, chemical vapor deposition and the like.

While the present invention has been described with reference to the specific details of a preferred embodiment, it is not intended that such details should be regarded as limitations upon the scope of the invention, except insofar as included in the accompanying claims.

I claim:

1. In a method of treating a pair of superimposed glass sheets which are subsequently fused together around the edges thereof to form a welded multiple glazed unit, the improvement comprising, depositing an organo-metallic film-forming material on the interfacial surface of at least one of said superimposed glass sheets, heating the organo-metallic film-forming material to a temperature sufficient to produce a metal oxide film on the contacted glass sheet, said metal oxide film having a water-wetting surface contact angle of from about 40° to about 90°, and fusing the edge portions of said sheets together.

2. A method according to claim 1 which includes fusing the edge portions of said sheets together by electric heating while supporting said sheets in slightly spaced relation to each other.

3. A method according to claim 2 wherein the organo-metallic film-forming material comprises an organo-metallic solution having its metallic constituent selected from the group consisting of titanium, tin, nickel, chromium, cobalt, iron, magnesium and mixtures thereof.

4. A method according to claim 2 wherein the organo-metallic film-forming material is a solution of an organic titanate and the metal oxide film produced therefrom has water-wetting surface contact angle of from about 75° to 80°.

5. A method according to claim 4 wherein the metal oxide film is transparent.

6. In a method of treating a pair of superimposed glass sheets which are subsequently fused together around the edges thereof to form a welded multiple glazed unit, the improvement comprising, depositing a metal oxide film on th interfacial surface of at least one of said superimposed glass sheets, said metal oxide film having a water-wetting surface contact angle of from about 40° to about 90°, and fusing the edge portions of said sheets together.

7. A method according to claim 6 which includes fusing the edge portions of said sheets together by electric heating while supporting said sheets in slightly spaced relation to each other.

8. A method according to claim 7 in which said sheets are heated to an elevated temperature prior to fusing the edge portions of said sheets together by electric heating.

9. A method according to claim 7 wherein the metal component of the metal oxide film is selected from the group consisting of titanium, tin, nickel, chromium, cobalt, iron, magnesium and mixtures thereof.

10. A method according to claim 7 wherein the metal oxide film is titanium dioxide and said film has a water-wetting surface contact angle of from about 75° to 80°.

11. A method according to claim 10 wherein the metal oxide film is transparent.

12. A multiple glazed unit comprising a pair of spaced glass sheets fused together around their edges by electric heating to provide an insulating air space therebetween, and having an adherent metal oxide film on at least one of the interfacial surfaces of said unit, said metal oxide film having a water-wetting surface contact angle of from about 40° to about 90°.

13. A multiple glazed unit according to claim 12 wherein said metal oxide film is transparent.

References Cited
UNITED STATES PATENTS

| | | | |
|---|---|---|---|
| 3,360,351 | 12/1967 | Murray et al. | 65—24 |
| 3,425,859 | 2/1969 | Steigelman | 65—60 X |
| 3,475,150 | 10/1969 | Bishop et al. | 65—60 |

ROBERT L. LINDSAY, JR., Primary Examiner

U.S. Cl. X.R.

52—304; 65—24, 58, 60; 117—124 A, 124 T; 161—192